United States Patent
Mao et al.

(10) Patent No.: US 12,420,689 B2
(45) Date of Patent: Sep. 23, 2025

(54) ARMREST ASSEMBLY WITH ADJUSTABLE MOUNTING SHAFT

(71) Applicant: Lear Corporation, Southfield, MI (US)

(72) Inventors: Zhengda Mao, Shanghai (CN); Mingzhe Zhao, Shanghai (CN); Yili Wu, Shanghai (CN)

(73) Assignee: Lear Corporation, Southfield, MI (US)

( * ) Notice: Subject to any disclaimer, the term of this patent is extended or adjusted under 35 U.S.C. 154(b) by 179 days.

(21) Appl. No.: 18/210,112

(22) Filed: Jun. 15, 2023

(65) Prior Publication Data
US 2023/0406184 A1    Dec. 21, 2023

(30) Foreign Application Priority Data
Jun. 15, 2022  (CN) .......................... 202210681310.9

(51) Int. Cl.
| | | |
|---|---|---|
| *B60N 2/70* | (2006.01) | |
| *B60N 2/75* | (2018.01) | |
| *A47C 7/54* | (2006.01) | |
| *A61G 15/12* | (2006.01) | |
| *B64D 11/06* | (2006.01) | |

(52) U.S. Cl.
CPC .............. *B60N 2/757* (2018.02); *A47C 7/543* (2013.01); *A61G 15/125* (2013.01); *B60N 2/763* (2018.02); *B64D 11/0644* (2014.12)

(58) Field of Classification Search
CPC .......... B60N 2/757; B60N 2/753; B60N 2/76; B60N 2/763; B60N 2/78; A47C 7/543; A61G 15/125; B64D 11/0644
See application file for complete search history.

(56) References Cited

U.S. PATENT DOCUMENTS

| | | | | |
|---|---|---|---|---|
| 4,018,104 | A * | 4/1977 | Bland ...................... | G05G 5/22 74/513 |
| 4,491,436 | A * | 1/1985 | Easton ................ | F16C 11/0614 403/131 |
| 4,586,750 | A * | 5/1986 | Vogel ..................... | A47C 7/543 297/411.32 |
| 5,342,115 | A * | 8/1994 | De Filippo ............ | B60N 2/763 403/104 |
| 5,395,160 | A * | 3/1995 | Krebs .................... | A47C 7/543 297/411.3 |
| 5,937,482 | A * | 8/1999 | Horng ................... | G06F 1/1681 16/337 |
| 6,578,922 | B2 * | 6/2003 | Khedira ................ | B60N 2/753 297/411.3 |

(Continued)

FOREIGN PATENT DOCUMENTS

| | | |
|---|---|---|
| DE | 102017214628 A1 | 3/2018 |
| DE | 102017121229 A1 | 3/2019 |

(Continued)

*Primary Examiner* — Syed A Islam
(74) *Attorney, Agent, or Firm* — MacMillan, Sobanski & Todd, LLC

(57) ABSTRACT

An armrest assembly includes an armrest body. A first shaft extends from a first side of the armrest body along an armrest axis and is attached to the armrest body for relative rotational movement about the armrest axis. A second shaft extends from a second side of the armrest body along the armrest axis and is attached to the armrest body for relative rotational movement about the armrest axis and relative axial movement.

12 Claims, 10 Drawing Sheets

(56) References Cited

U.S. PATENT DOCUMENTS

| | | | | |
|---|---|---|---|---|
| 6,671,928 B2* | 1/2004 | Huang | ............... | F16M 11/10 |
| | | | | 16/337 |
| 7,077,477 B1* | 7/2006 | Syrowik | ............... | B60N 2/753 |
| | | | | 297/411.3 |
| 7,140,688 B2* | 11/2006 | Hann | ............... | B60N 2/753 |
| | | | | 297/411.32 |
| 8,516,668 B2* | 8/2013 | Weber | ............... | B60N 2/78 |
| | | | | 297/411.32 |
| 8,960,786 B2* | 2/2015 | Henke | ............... | B60N 2/757 |
| | | | | 297/14 |
| 9,132,755 B2* | 9/2015 | Rosenbrock | ........... | B60N 2/753 |
| 9,162,597 B2 | 10/2015 | Charles et al. | | |
| 9,227,538 B2 | 1/2016 | Girbinger et al. | | |
| 9,776,538 B1* | 10/2017 | Cheng | ............... | B60N 2/682 |
| 9,950,651 B2* | 4/2018 | Delling | ............ | B60N 2/933 |
| 10,131,258 B2* | 11/2018 | Akai | ............... | B60N 2/682 |
| 10,308,152 B2* | 6/2019 | Bohlke | ............ | B60N 2/753 |
| 10,336,229 B2* | 7/2019 | Johnson | ........... | B60N 2/757 |
| 10,434,912 B2 | 10/2019 | Zapf | | |
| 10,457,177 B2 | 10/2019 | Nuss et al. | | |
| 10,562,424 B2 | 2/2020 | Stuiber et al. | | |
| 10,710,483 B2 | 7/2020 | Keller | | |
| 10,889,218 B2 | 1/2021 | Vetere, II | | |
| 10,994,640 B2* | 5/2021 | Powell | ............... | B60N 2/793 |
| 11,351,899 B2* | 6/2022 | Kobayashi | ............ | B60N 2/75 |
| 11,752,910 B2* | 9/2023 | Boddenberg | .......... | B60N 2/767 |
| | | | | 297/411.32 |
| 2018/0339627 A1 | 11/2018 | Keller et al. | | |
| 2020/0345146 A1* | 11/2020 | Himmelhuber | ........ | B60N 2/777 |

FOREIGN PATENT DOCUMENTS

| | | |
|---|---|---|
| DE | 102020120824 A1 | 4/2021 |
| EP | 3572275 A1 | 11/2019 |
| FR | 2882306 A1 | 8/2006 |
| FR | 3052410 A1 | 12/2017 |
| FR | 3070919 A1 | 3/2019 |
| FR | 3073464 A1 | 5/2019 |
| FR | 3074111 A1 | 5/2019 |
| FR | 3080584 A1 | 11/2019 |
| FR | 3082467 A1 | 12/2019 |
| FR | 3096620 A1 | 12/2020 |
| WO | 2021009169 A1 | 1/2021 |

* cited by examiner

US 12,420,689 B2

ARMREST ASSEMBLY WITH ADJUSTABLE MOUNTING SHAFT

BACKGROUND OF THE INVENTION

This invention relates in general to a seat that includes an armrest assembly for comfortably supporting an arm of an occupant of the seat. In particular, this invention relates to an improved structure for such an armrest assembly that is movable between usage and storage positions.

Vehicles, such as passenger cars, typically include one or more seats for supporting occupants therein. In many instances, a vehicle seat includes an armrest assembly that is provided for comfortably supporting an arm of an occupant of the seat. In many instances, the armrest assembly is pivotably movable relative to the seat between a lowered usage position and a raised storage position. When located in the lowered usage position, the armrest assembly extends generally horizontally adjacent to a bottom portion of the seat and is available for use by the occupant therein. When located in the raised storage position, the armrest assembly extends generally vertically adjacent to a back portion of the seat. One example of such an armrest assembly is disclosed in U.S. Pat. No. 10,336,229, the disclosure of which is incorporated herein by reference.

It would be desirable to provide an improved structure for an armrest assembly for a seat that is movable between usage and storage positions.

SUMMARY OF THE INVENTION

This invention relates to improved structure for an armrest assembly for a seat that is movable between usage and storage positions. The armrest assembly includes an armrest body. A first shaft extends from a first side of the armrest body along an armrest axis and is attached to the armrest body for relative rotational movement about the armrest axis. A second shaft extends from a second side of the armrest body along the armrest axis and is attached to the armrest body for relative rotational movement about the armrest axis and relative axial movement Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
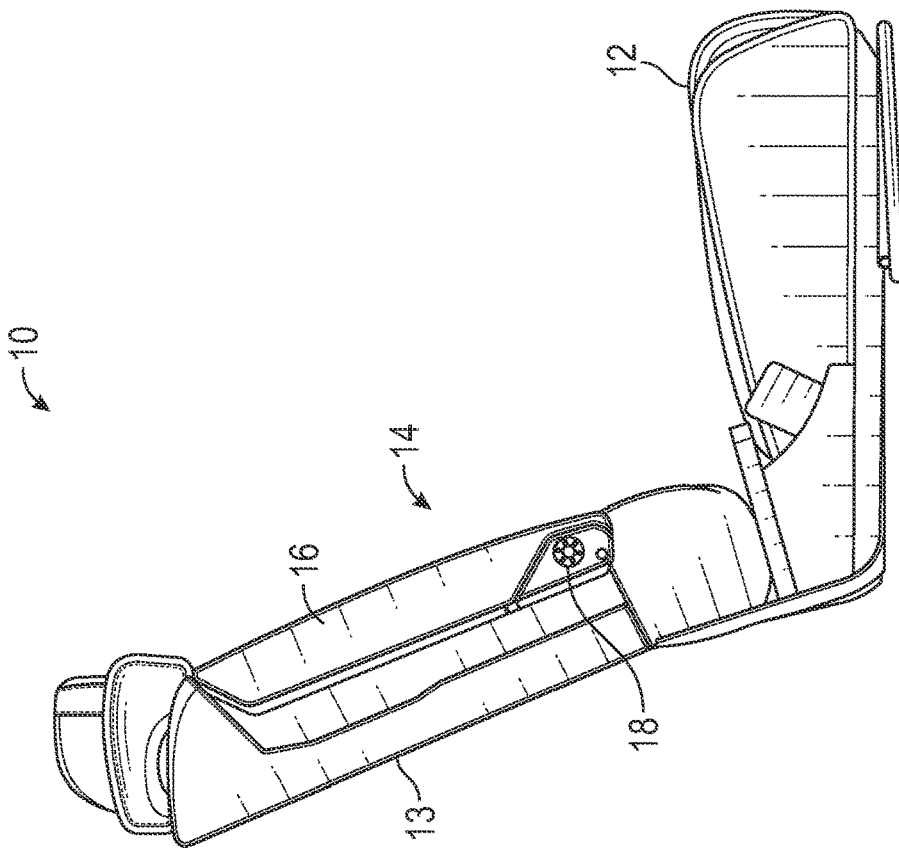
FIG. 1 is a side elevational view of a seat that includes an armrest assembly in accordance with this invention, wherein the armrest assembly is shown in a stowed position relative to the seat.

Referring now to the drawings, there is illustrated in FIG. 1 a side elevational view of a seat, indicated generally at 10, in accordance with this invention. The illustrated seat 10 is a conventional seat for a vehicle that includes a seat bottom portion 12 and a seat back portion 13, but the seat 10 may be any desired type of seat. The seat also includes an armrest assembly, indicated generally at 14. The armrest assembly 14 includes an armrest 16 that is movable relative to the seat 10 between a stowed position (illustrated in FIG. 1) and a usage position (illustrated in FIG. 2). To accomplish this, the armrest 16 may be rotated relative to the seat 12 about an armrest axis 18. When the armrest 16 is in the usage position, a trim surface 20 is presented for use by an occupant of the seat 12.

Figure 3:
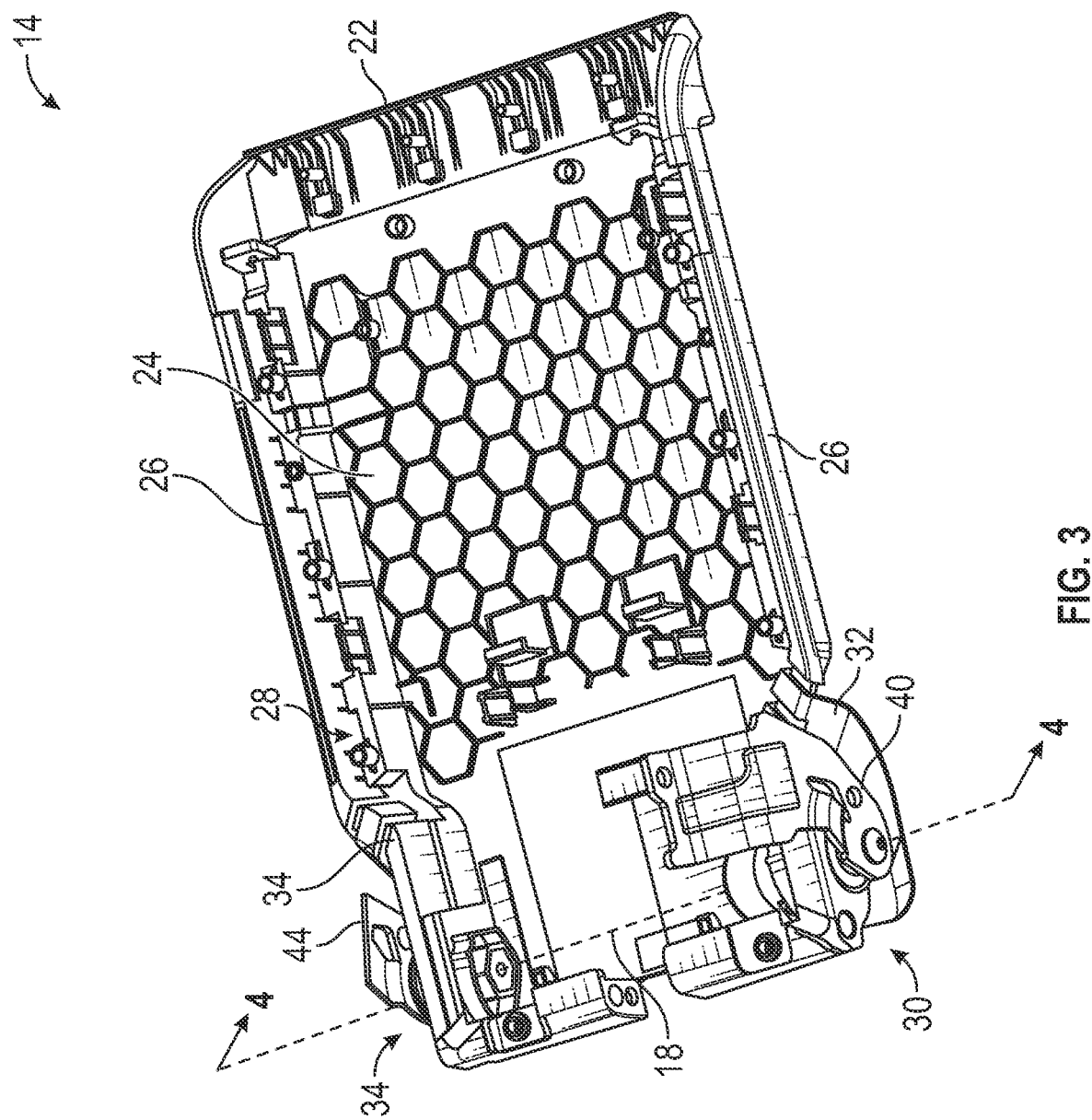
FIG. 3 is an enlarged perspective view of a portion of the armrest assembly shown in FIG. 1.

Referring to FIG. 3, there is illustrated a perspective view of part of the armrest assembly 14. The trim surface 20 of the armrest 16 is not shown in FIG. 3 so that interior parts of the armrest assembly 14 are visible. The armrest assembly 14 includes an armrest body 22. The illustrated armrest body 22 is molded from plastic, but may be made from any desired material using any desired process. The armrest body 22 includes a base 24 and two walls 26 that define an interior space, indicated generally at 28.

The armrest assembly 14 includes a first shaft assembly, indicated generally at that is located on a first side 32 of the armrest body 22. The armrest assembly 14 also includes a second shaft assembly, indicated generally at 34, that is located on a second side 36 of the armrest body 22.

Figure 4:
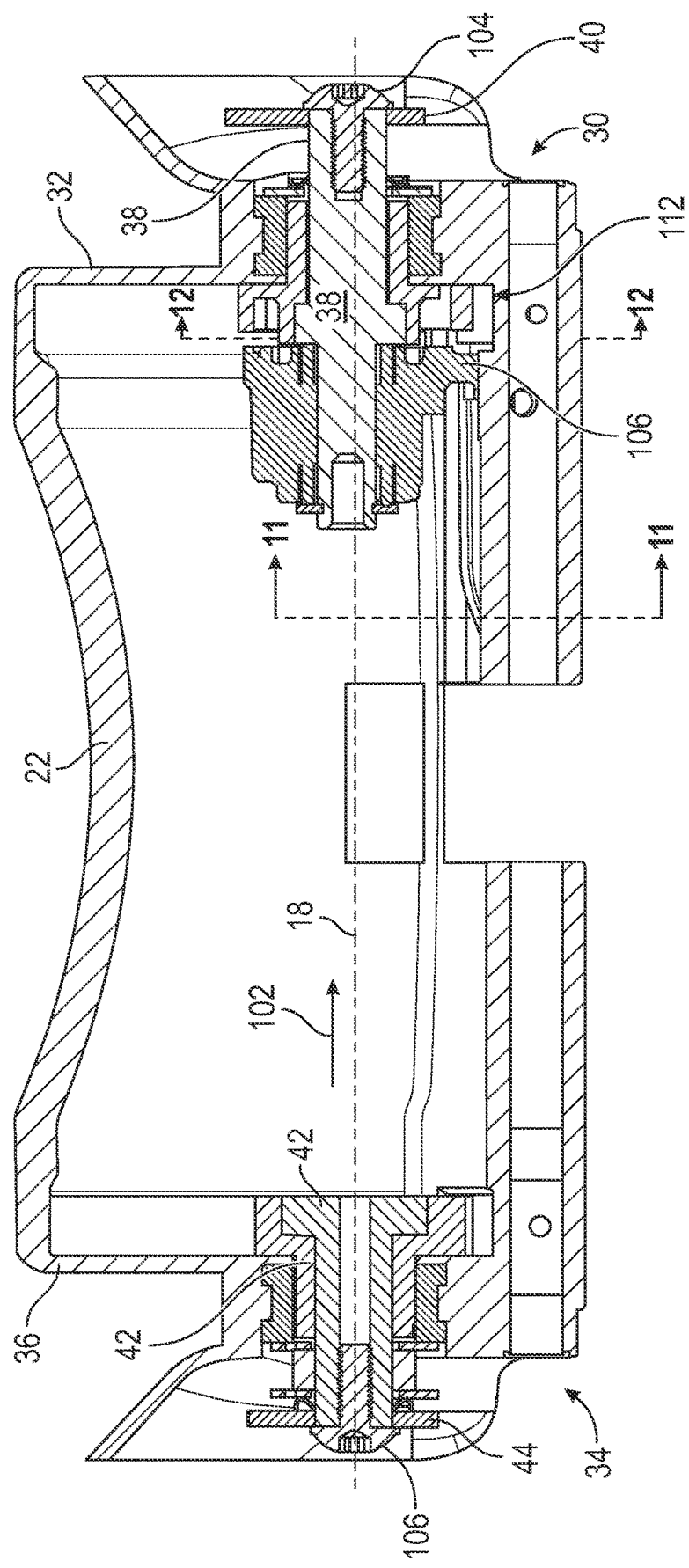
FIG. 4 is a cross-sectional view taken along line 4-4 of FIG. 3.

Referring to FIG. 4, there is illustrated a cross-sectional view taken along line 4-4 of FIG. 3. The cross-section illustrated in FIG. 4 is taken along the armrest axis 18. The first shaft assembly 30 includes a first shaft 38. The first shaft 38 extends from the first side 32 of the armrest body 22 along the armrest axis 18. The first shaft 38 engages a first bracket 40 that is attached to the seat assembly 10. The second shaft assembly 34 includes a second shaft 42. The second shaft 42 extends from the second side 36 of the armrest body 22 along the armrest axis 18. The second shaft 42 engages a second bracket 44 that is also attached to the seat assembly 10.

Figure 5:
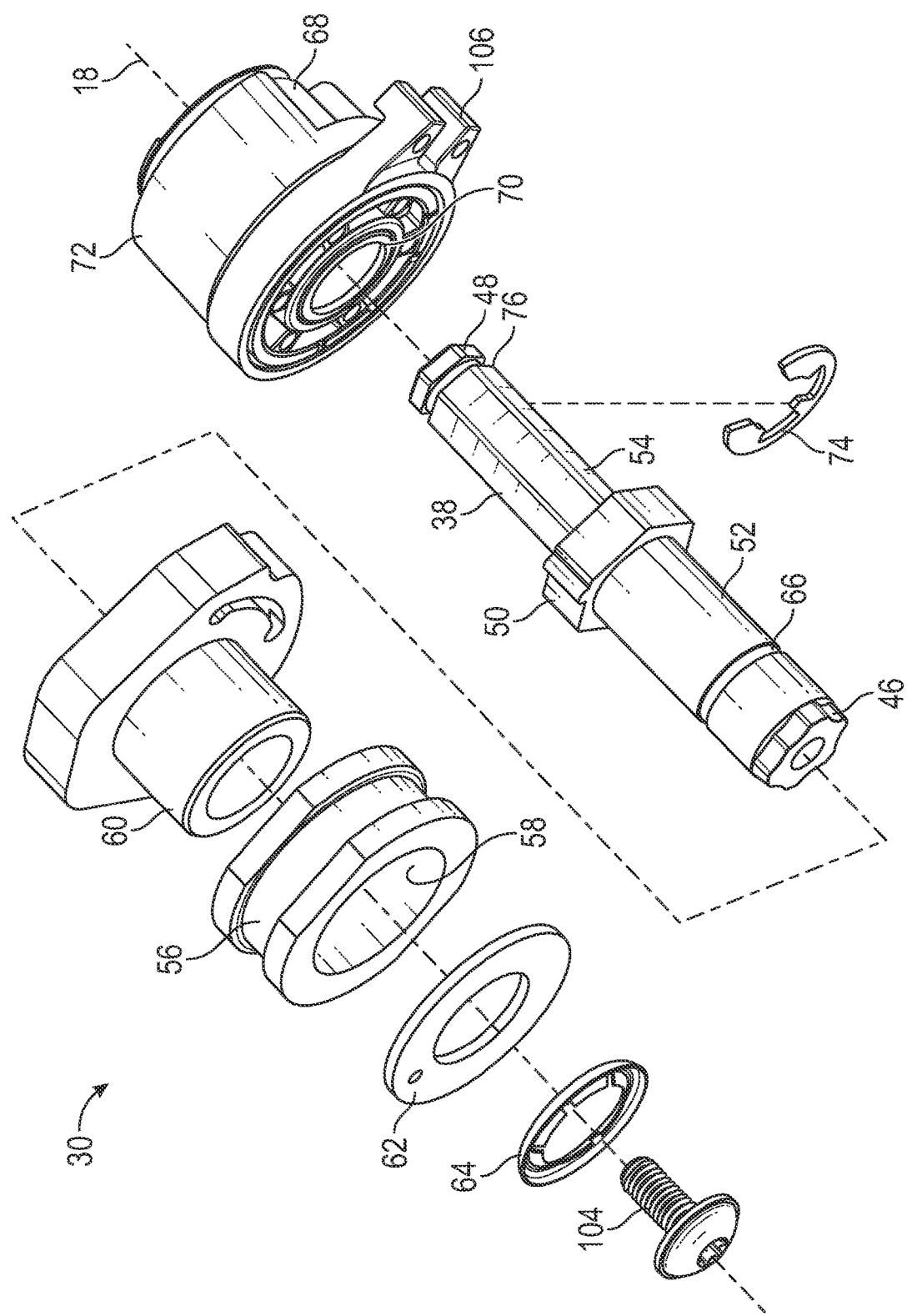
FIG. 5 is an exploded perspective view of a first shaft assembly of the armrest assembly shown in FIGS. 3 and 4.
Figure 6:
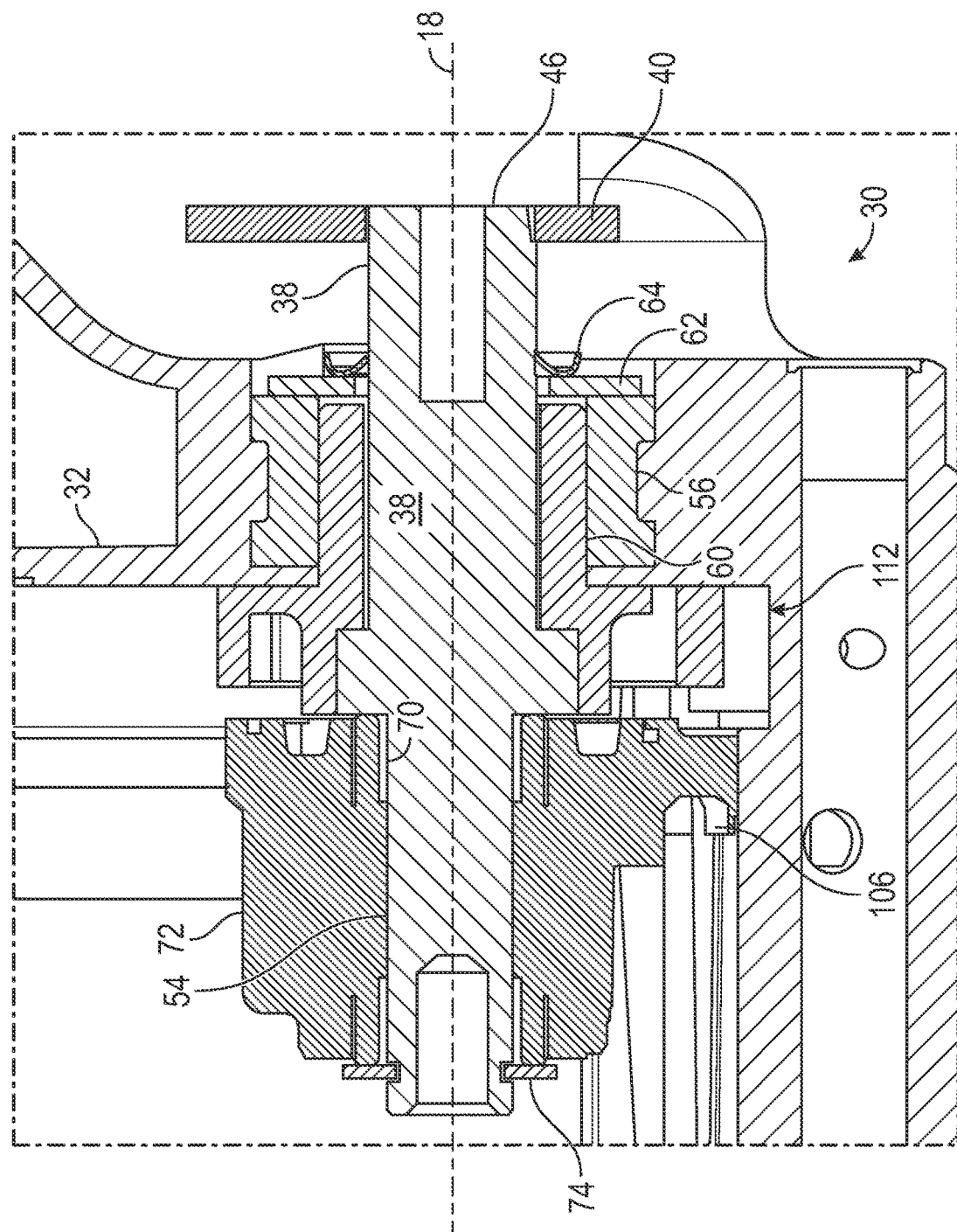
FIG. 6 is a cross-sectional view of the first shaft assembly shown partially assembled.

Referring now to FIG. 5, there is illustrated an exploded perspective view of the first shaft assembly 30. Referring to FIG. 6, there is shown an enlarged view of a cross-sectional view similar to FIG. 4, with the first shaft assembly 30 shown partially assembled. The first shaft 38 is made of metal, but may be made of any desired material. The first shaft 38 extends from a first keyed end 46 to a first inner end 48 and includes a bushing mount 50 therebetween. When the armrest assembly 14 is assembled, the first shaft 38 extends along the armrest axis 18, as shown in FIG. 6. The first shaft 38 includes a rotation support portion 52 between the keyed end 46 and the bushing mount 50. The illustrated rotation support portion 52 has a circular cross-sectional shape around the armrest axis 18, but may have any desired shape. The first shaft 38 also includes a fixed support portion 54 between the bushing mount 50 and the first inner end 48. The illustrated fixed support portion 54 has a hexagonal cross-sectional shape around the armrest axis 18, but may have any desired shape.

The first shaft assembly 30 includes a first insert 56. The first insert 46 is made of metal but may be made of any desired material. As shown in FIG. 6, when the armrest assembly 14 is assembled, the first insert 56 is fixed on the armrest body 32. The first insert 56 includes an insert opening 58 that extends through the first insert 56, and the armrest axis 18 passes through the insert opening 58. The insert opening 58 has a circular cross-sectional shape around the armrest axis 18.

The first shaft assembly 30 includes a bushing 60. The bushing 60 is made of plastic, but may be made of any desired material. The bushing 60 is located around the rotation support portion 52 of the first shaft 38, and the bushing 60 engages the bushing mount 50. As shown in FIG. 6, the bushing 60 is fixed to the first shaft 38 and is located in the insert opening 58 between the first shaft 38 and the first insert 56. The bushing 60 provides a relatively low friction contact with the first insert 56 to facilitate rotation of the armrest body 22 relative to the first shaft 38.

The first shaft assembly 30 includes a friction washer 62 and a retainer 64 that are located between the first insert 56 and the keyed end 46 of the first shaft 38. The retainer 64 engages a slot 66 in the surface of the rotation support portion 52 and presses the friction washer 62 into engagement with the first insert 56. As shown in FIG. 6, when the first shaft assembly 30 is assembled, the first insert 56 is captured between the bushing 60 and the friction washer 62. Thus, the first shaft assembly 30 is prevented from moving relative to the armrest body 22 in a direction parallel to the armrest axis 18. However, the first shaft 38 and the bushing 60 are able to rotate relative to the armrest body 22 about the armrest axis 18.

The first shaft assembly 30 also includes a rotational damper 68. The rotational damper 68 includes a damper inner 70 and a damper shell 72. The damper shell 72 is attached to the damper inner 70 for relative rotation about the armrest axis 18. The illustrated rotational damper 68 is an oil damper that includes a viscous fluid (not shown) to limit the rate of movement of the damper shell 72 relative to the damper inner as is known in the art. The rotational damper 68 is located on the fixed support portion 54 of the first shaft 38, and the damper inner 70 is fixed to the first shaft 38. A retaining washer 74 engages a slot 76 in the fixed support portion 54 of the first shaft 38 and is fixed to the first shaft 38 between the rotational damper 68 and the inner end 48. As shown in FIG. 6, when the first shaft assembly 30 is assembled, the rotational damper 68 is captured between the retaining washer 74 and the bushing mount 50 to prevent the rotational damper 68 from moving relative to the first shaft 38 in a direction parallel to the armrest axis 18. Additionally, when the first armrest assembly 14 is assembled, the rotational damper 68 is located in the interior space 28 of the armrest body 22. The operation of the rotational damper 68 will be described below.

Figure 7:
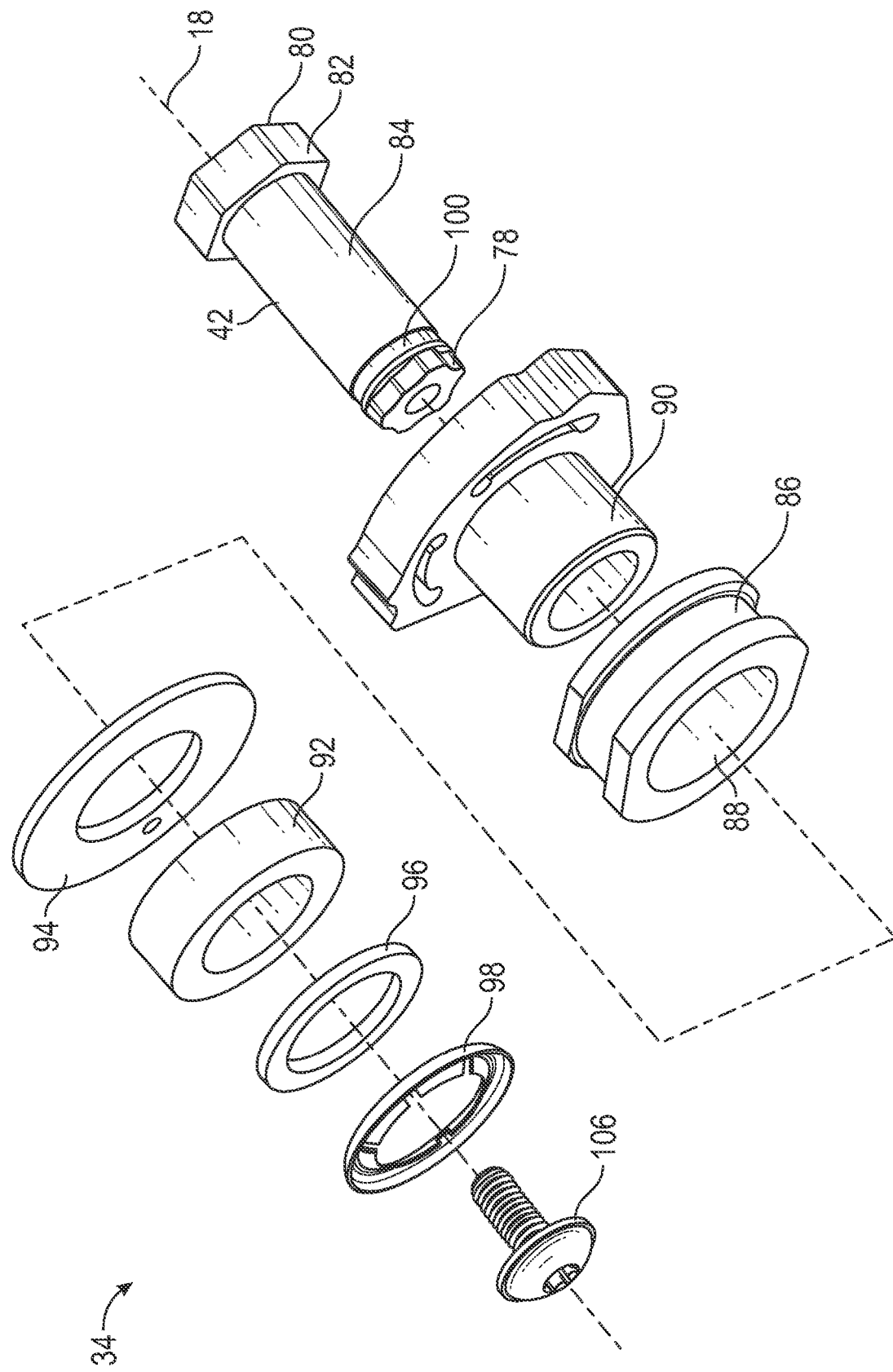
FIG. 7 is an exploded perspective view of a second shaft assembly of the armrest assembly shown in FIGS. 3 and 4.
Figure 8:
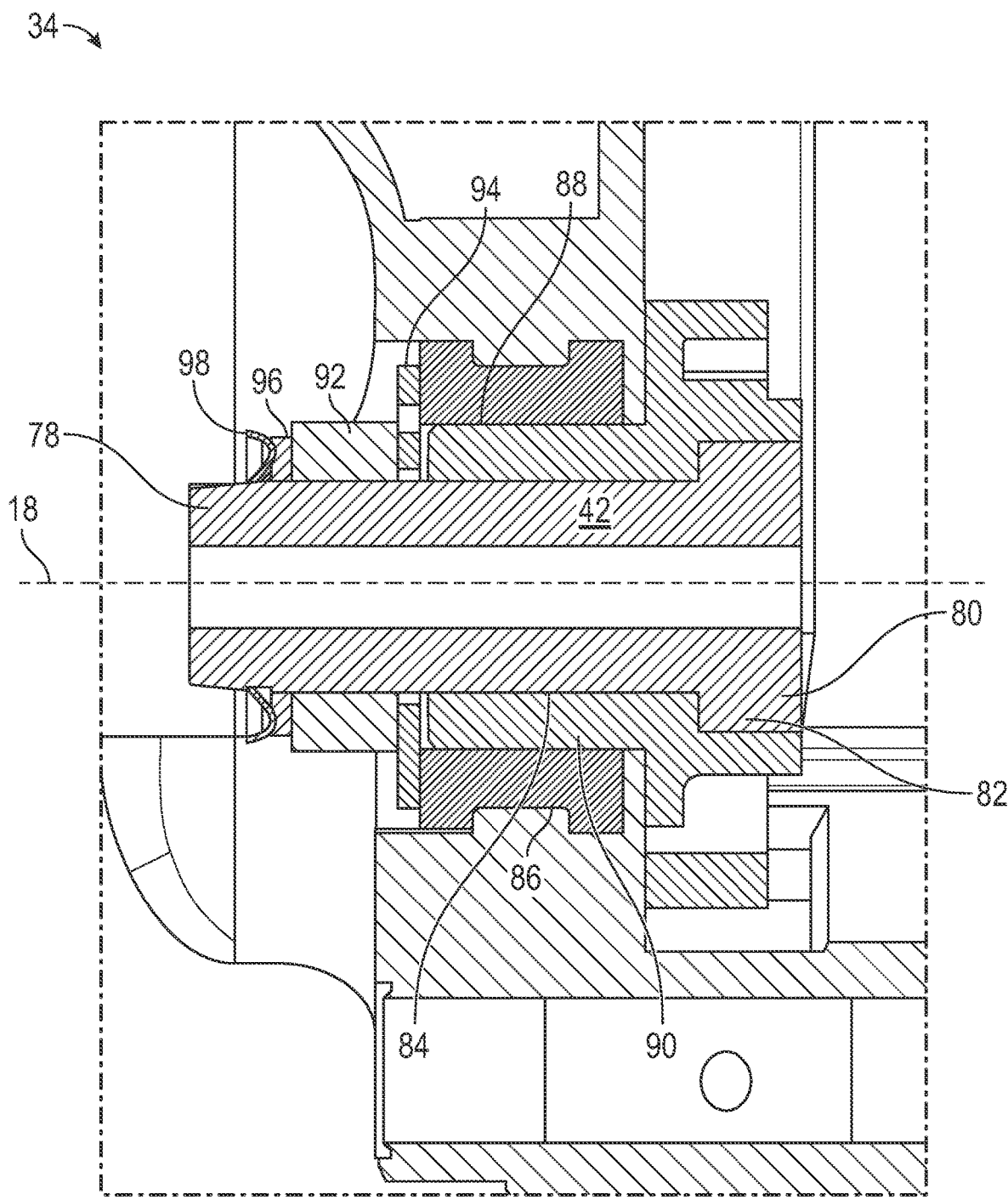
FIG. 8 is a cross-sectional view of the second shaft assembly shown partially assembled.

Referring now to FIG. 7, there is illustrated an exploded perspective view of the second shaft assembly 34. Referring to FIG. 8, there is shown an enlarged view of a cross-sectional view similar to FIG. 4, with the second shaft assembly 34 shown partially assembled. The second shaft 42 is made of metal, but may be made of any desired material. The second shaft 42 extends from a second keyed end 78 to a second inner end and includes a bushing mount 82 therebetween. When the armrest assembly 14 is assembled, the second shaft 42 extends along the armrest axis 18, as shown in FIG. 8. The second shaft 42 includes a rotation support portion 84 between the second keyed end 78 and the bushing mount 82. The illustrated rotation support portion 84 has a circular cross-sectional shape around the armrest axis 18, but may have any desired shape. In the illustrated embodiment, the bushing mount 82 is located adjacent to the second inner end but may be in any desired location on the second shaft 42.

The second shaft assembly 34 includes a second insert 86. The second insert 86 is made of metal but may be made of any desired material. As shown in FIG. 8, when the armrest assembly 14 is assembled, the second insert 86 is fixed on the armrest body 32. The second insert 86 includes an insert opening 88 that extends through the second insert 86, and the armrest axis 18 passes through the insert opening 88. The insert opening 88 has a circular cross-sectional shape around the armrest axis 18.

The second shaft assembly 34 includes a bushing 90. The bushing 90 is made of plastic but may be made of any desired material. The bushing 90 is located around the rotation support portion 84 of the second shaft 42, and the bushing 90 engages the bushing mount 82. As shown in FIG. 8, the bushing 90 is fixed to the second shaft 42 and is located in the insert opening 88 between the second shaft 42 and the second insert 86. The bushing 90 provides a relatively low friction contact with the second insert 86 to facilitate rotation of the armrest body 22 relative to the second shaft 42.

The second shaft assembly 34 includes a resilient washer 92 that is located between two friction washers 94 and 96 that are provided between the second insert 86 and the second keyed end 78 of the second shaft 42. The resilient washer 92 is a resilient member. A retainer 98 engages a slot 100 in the surface of the rotation support portion 52 and presses the friction washer 96 into engagement with the resilient washer 92. The resilient washer 92 is further pressed into engagement with the friction washer 94. As shown in FIG. 8, when the second shaft assembly 34 is assembled, the second insert 86 is captured between the bushing 90 and the friction washer 94 and thus prevents the second shaft assembly 34 from moving relative to the armrest body 22 in a direction parallel to the armrest axis 18. However, the second shaft 42 and the bushing 90 are able to rotate relative to the armrest body 22 about the armrest axis 18.

Figure 9:
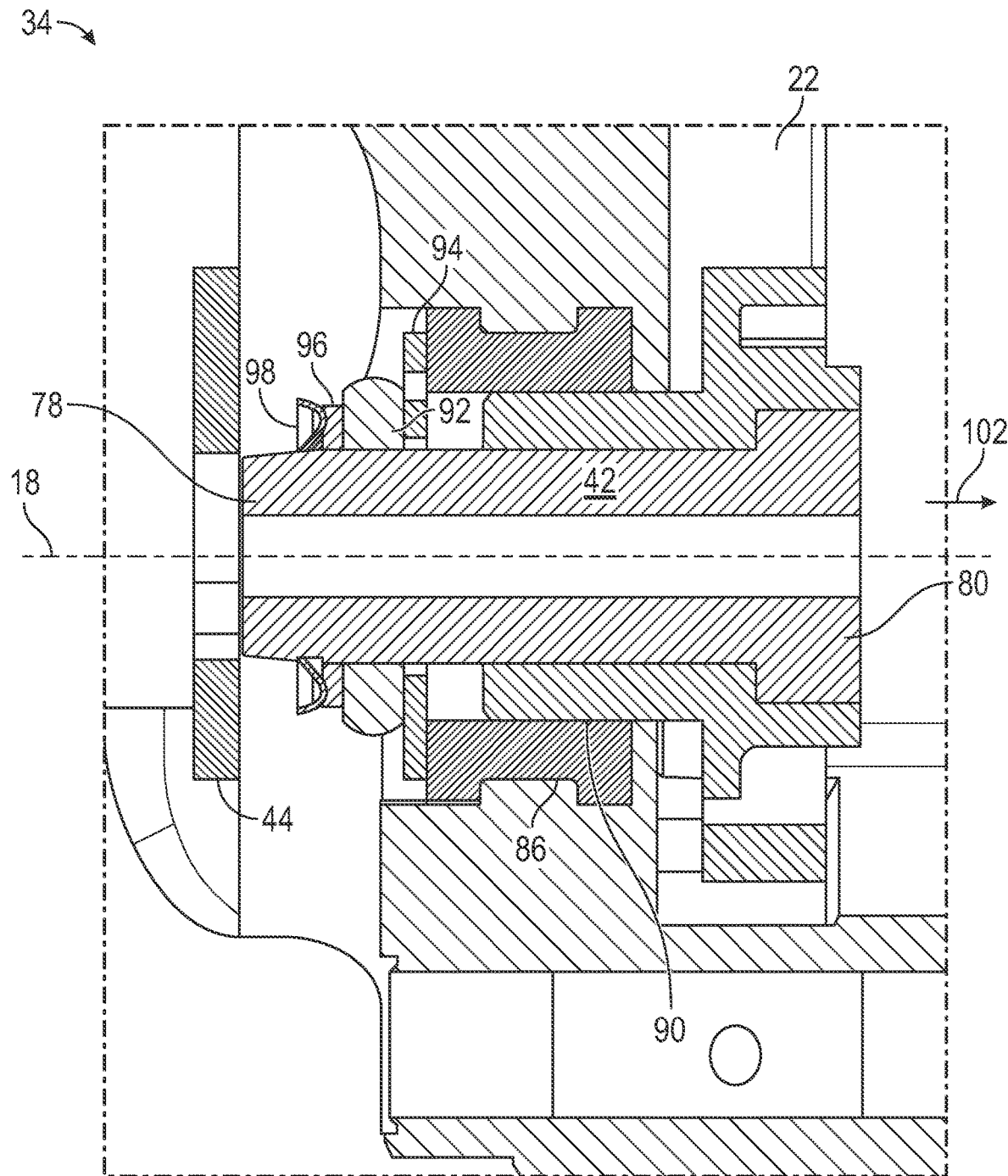
FIG. 9 is a cross-sectional view similar to FIG. 8 showing the second shaft assembly in an inserted position relative to the seat.

The assembled armrest assembly 14, including the first shaft assembly 30 and the second shaft assembly 34, is adapted to be connected to the seat 12 as described below. Referring to FIG. 6, the first keyed end 46 of the first shaft 38 engages the first bracket 40. As best shown in FIG. 5, the first keyed end 46 has a non-circular shape and engages the first bracket 40 to prevent rotation of the first shaft 38 relative to the first bracket 40. Referring to FIG. 9, there is illustrated a cross-sectional view of the second shaft assembly 34 similar to FIG. 8. As shown in FIG. 9, the second keyed end 78 of the second shaft 42 is moved relative to the armrest body 22 in an insertion direction 102 parallel to the armrest axis 18 toward the first shaft assembly 30 (not shown in FIG. 9). As previously described, the bushing 90 and the retainer 98 are fixed to the second shaft 42. Thus, the bushing 90 and the retainer 98 are also moved in the insertion direction 102 relative to the armrest body 22 along with the second shaft 42. The retainer 98 additionally causes the friction washer 96 to move in the insertion direction 102 relative to the friction washer 94. As a result, the resilient washer 92 is compressed between the friction washer 94 and the friction washer 96. The second shaft assembly 34 is then located in an inserted position shown in FIG. 9.

Figure 10:
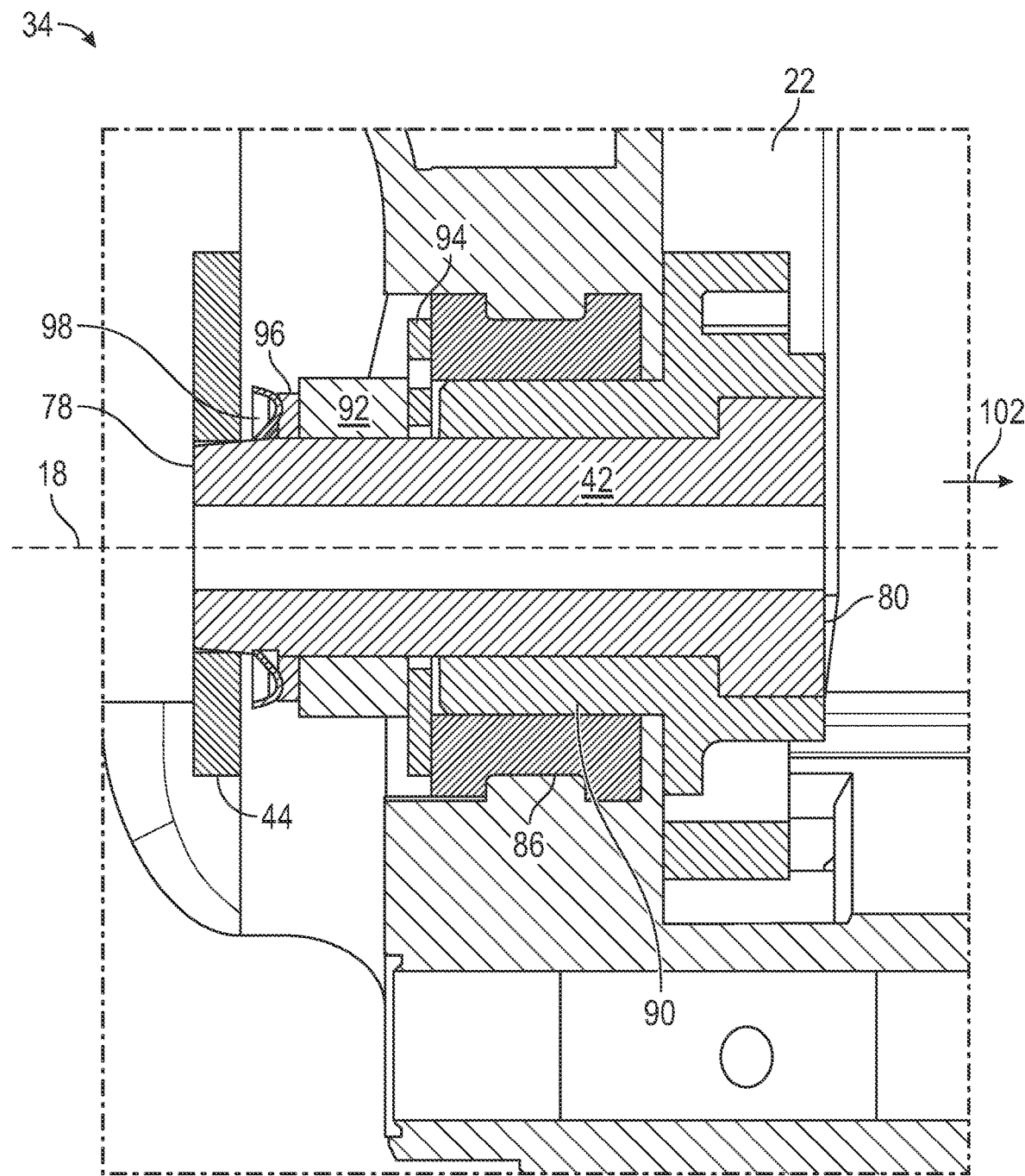
FIG. 10 is a cross-sectional view similar to FIG. 9 showing the second shaft assembly in an installed position relative to the seat.

While the second shaft assembly 34 is in the inserted position, the second keyed end 78 of the second shaft 42 is then positioned adjacent to the second bracket 44. Because the second keyed end 78 has been moved in the insertion direction 102, the second shaft 42 can be positioned between the first bracket 40 and the second bracket 44 when the first shaft is engaged with the first bracket 40. The second keyed end 78 is then moved opposite the insertion direction 102 so that the second keyed end 78 engages the second bracket 44. This locates the second shaft assembly 34 in an installed position shown in FIG. 10. As previously described, when the second shaft assembly 34 is in the inserted position shown in FIG. 9, the resilient washer 92 is compressed. This can be done, for example, by an operator applying force to the second shaft 42 in the insertion direction 102. The resilient washer 92 applies a force that biases the second shaft 42 opposite the insertion direction 102. When the force on the second shaft 42 is removed, the second shaft 42 is moved from the inserted position to the installed position shown in FIG. 10. As best shown in FIG. 7, the second keyed end 78 has a non-circular shape and engages the second bracket 44 to prevent rotation of the second shaft 42 relative to the second bracket 44.

Referring back to FIG. 5, the first shaft assembly 30 also includes a screw 104. As shown in FIG. 4, the screw 104 is attached to the first keyed end 46 of the first shaft 38 to fix the first shaft 38 in position relative to the first bracket 40. Similarly, referring to FIG. 7, the second shaft assembly 34 includes a screw 106. As shown in FIG. 4, the screw 106 is attached to the second keyed end 78 of the second shaft 42 to fix the second shaft 42 in place relative to the second bracket 44.

Figure 11:
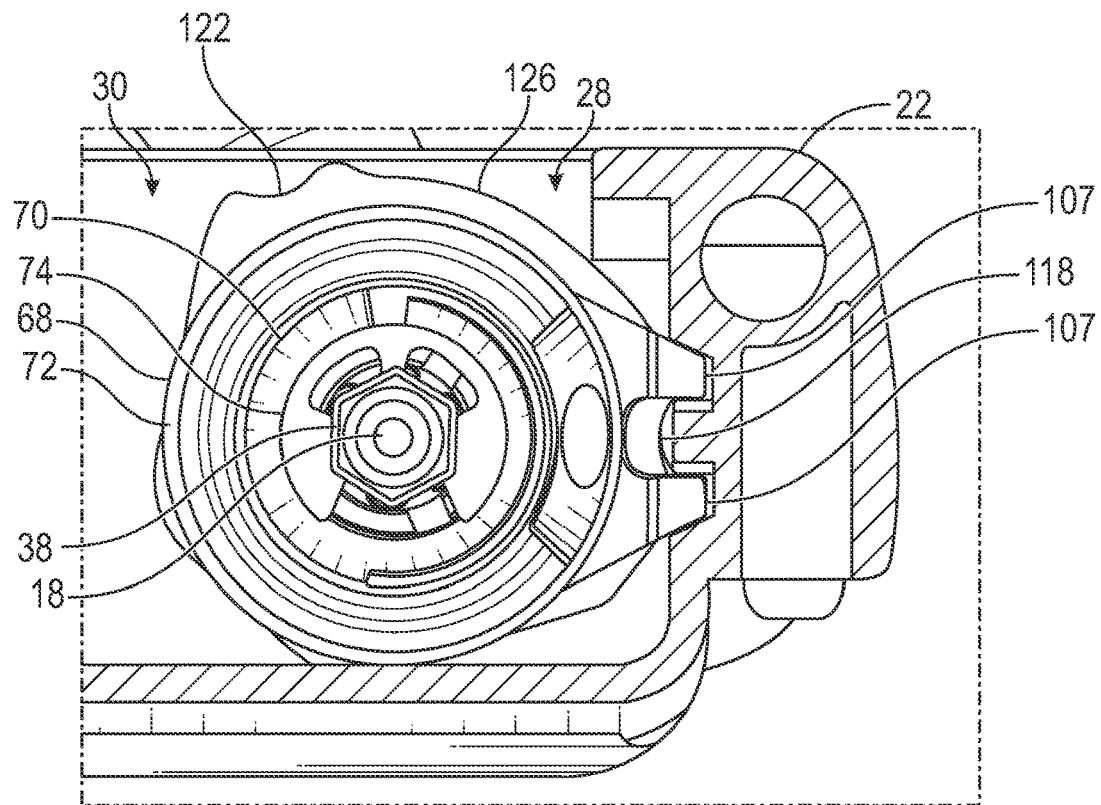
FIG. 11 is a cross-sectional view taken along line 11-11 of FIG. 4.

When the armrest assembly 14 is attached to the seat 12, the first shaft 38 and the second shaft 42 are fixed relative to the seat 12, and the armrest body 22 is adapted to be rotated relative to both the first shaft 38 and the second shaft 42 about the armrest axis 18. This allows the armrest 16 to be rotated relative to the seat 12. Referring to FIG. 11, there is illustrated an end view of the first shaft assembly 30 taken along line 11-11 of FIG. 4. The rotational damper 68 includes a grip 107 on the damper shell 72 that engages the armrest body 22 to fix the damper shell 72 relative to the armrest body 22. As previously described, the damper inner 70 is fixed relative to the first shaft 38. Thus, when the armrest 16 is moved relative to the seat 12 between the stowed position shown in FIG. 1 and the usage position shown in FIG. 2, the rotational damper 68 is adapted to dampen the movement of the armrest 16 relative to the seat 12.

Figure 2:
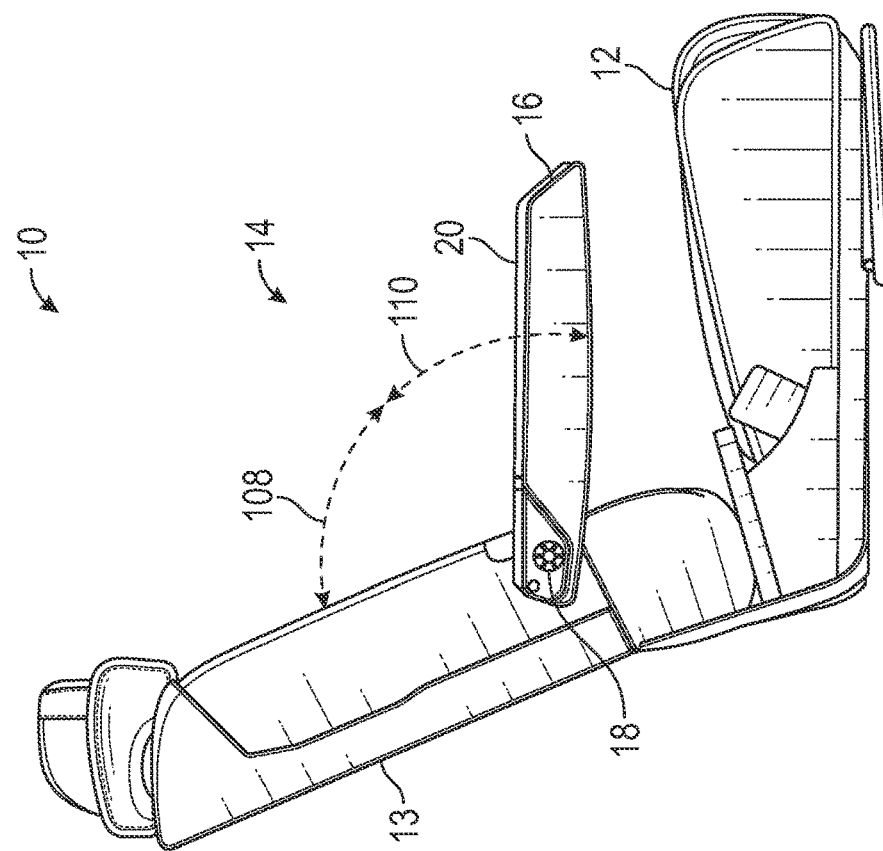
FIG. 2 is a side elevational view similar to FIG. 1 showing the armrest assembly in a usage position relative to the seat.

Referring to FIG. 2, the illustrated armrest 16 is adapted to be moved relative to the seat 12 from the stowed position shown in FIG. 1 through a first range of motion 108. During the first range of motion 108, the movement of the armrest 16 relative to the seat 12 is not restricted by the rotational damper 68. The illustrate armrest 16 is further adapted to be moved relative to the seat 12 through a second range of motion 110 to the usage position. During the second range of motion 110, the movement of the armrest 16 relative to the seat 12 is restricted by the rotational damper 68. Thus, the rotational damper 68 prevents the armrest 16 from suddenly moving to the usage position. In the illustrated embodiment, both the first range of motion 108 and the second range of motion 110 are approximately fifty-six degrees of rotation. However, the first range of motion 108 and the second range of motion 110 may be any desired size or sizes.

Figure 12:
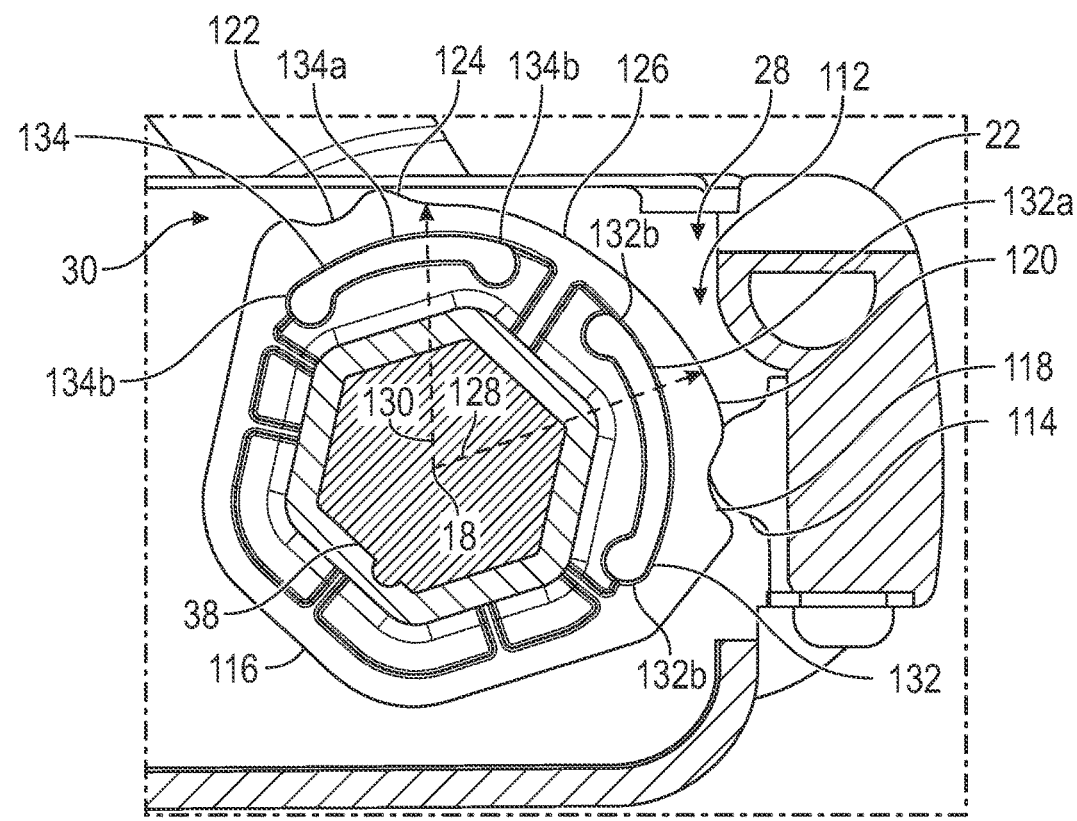
FIG. 12 is a cross-sectional view taken along line 12-12 of FIG. 4.

Referring to FIG. 12, there is illustrated a cross-sectional view taken along line 12-12 of FIG. 4. The view illustrated in FIG. 12 is taken through the first shaft assembly 30 and parallel to FIG. 11. The armrest assembly 14 includes a detent assembly, indicated generally at 112. The detent assembly 112 is adapted to retain the armrest 16 in a position relative to the seat 12. The detent assembly 112 includes a stop 114 and a detent body 116. The illustrated stop 114 is made of resilient rubber, but may be made of any desired material. The stop 114 is fixed on the armrest body 22 and is located in the interior space 28 of the armrest body 22. The detent body 116 is made from molded plastic, but may be made of any desired material using any desired process. The illustrated detent body 116 is molded as part of the bushing 60, but may be a separate part of the armrest assembly 14. The detent body 116 is fixed relative to the first shaft 38 and is located in the interior space 28 of the armrest body 22. Because the first shaft 38 is fixed relative to the seat 12, when the armrest 16 is moved relative to the seat 12, the stop 114 is moved relative to the detent body 116.

When the armrest 16 is in the usage position, the stop 114 is located in a first detent 118 on the detent body 116, as shown in FIG. 12. The first detent 118 is defined, at least in part, by a first rise 120. When the armrest 16 is moved from the usage position toward the stowed position, the stop 114 engages the first rise 120 to resist movement of the armrest 16 relative to the seat 12. Further, when the armrest 16 is in the stowed position, the stop 114 is located in a second detent 122 on the detent body 116. The second detent 122 is defined, at least in part, in part by a second rise 124. When the armrest 16 is moved from the stowed position toward the usage position, the stop 114 engages the second rise 124 to resist movement of the armrest 16 relative to the seat 12.

The detent body 116 includes a detent surface 126 that is located between the first rise 120 and the second rise 124. The detent surface 126 is a curved surface that extends from the first rise 120 to the second rise 124. The illustrated detent surface 126 is nearest the armrest axis 18 adjacent to the second rise 124 and moves away from the armrest axis 18 at a substantially constant slope relative to the first rise 120. The detent surface 126 is located a first distance 128 from the armrest axis 18 adjacent to the first rise 120 and a second distance 130 from the armrest axis 18 adjacent to the second rise 124. In the illustrated embodiment, the first distance 128 is greater than the second distance 130. However, the detent surface 126 may have any desired shape. When the armrest 16 is moved from the stowed position to the usage position through the first range of motion 108 and the second range of motion 110, the stop 114 engages the detent surface 126.

The detent body 116 includes a first space 132 that is located between the first rise 120 and the armrest axis 18. The first space 132 is an open space that extends through the detent body 116 in a direction that is parallel to the armrest axis 18. The first space 132 extends between the first detent 118 and the armrest axis 18, and also between a portion of the detent surface 126 and the armrest axis 18. The first space 132 provides an amount of flexibility, allowing at least a portion of the detent body 116 to be deformed when the stop 114 engages the first rise 120. The first space 132 includes an arcuately-shaped middle portion 132a that extends between two end portions 132b located at opposed ends of the middle portion 132a. The illustrated end portions 132b extend closer to the armrest axis 18 than the middle portion 132a. However, the first space 132 may have any desired shape.

The detent body 116 also includes a second space 134 that is located between the second rise 124 and the armrest axis 18. The second space 134 is also an open space that extends through the detent body 116 in a direction that is parallel to the armrest axis 18. The second space 134 extends between the second detent 122 and the armrest axis 18, and also between a portion of the detent surface 126 and the armrest axis 18. The second space 130 provides an amount of flexibility, allowing at least a portion of the detent body 116 to be deformed when the stop 114 engages the second rise 124. The second space 134 includes an arcuate middle portion 134a that extends between two end portions 134b located at opposed ends of the middle portion 134a. The illustrated end portions 134b extend closer to the armrest axis 18 than the middle portion 134a. However, the second space 134 may have any desired shape.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An armrest assembly comprising:
an armrest body;
a first shaft that extends from a first side of the armrest body along an armrest axis and is attached to the armrest body; and
a second shaft that extends from a second side of the armrest body along the armrest axis and is attached to the armrest body for relative axial movement;
wherein the armrest body is adapted to be rotated relative to both the first shaft and the second shaft about the armrest axis.

2. The armrest assembly of claim 1, further including a resilient member that biases the second shaft in the axial direction relative to the armrest body away from the first shaft.

3. The armrest assembly of claim 1, wherein the second shaft includes a rotation support portion that extends from a keyed end to a bushing mount, further including a bushing attached to the bushing mount and fixed on the second shaft, and wherein the bushing is located between the rotation support portion of the second shaft and the armrest body.

4. The armrest assembly of claim 3, wherein the bushing mount is located in an interior space of the armrest body.

5. The armrest assembly of claim 4, further including a resilient washer on the second shaft that biases the second shaft in the axial direction relative to the armrest body away from the first shaft.

6. The armrest assembly of claim 5, wherein the resilient washer is located outside the interior space of the armrest body.

7. The armrest assembly of claim 6, wherein the resilient washer is located between two washers on the second shaft.

8. An armrest assembly comprising:
an armrest body;
a first shaft that extends from a first side of the armrest body along an armrest axis and is attached to the armrest body;
a second shaft that extends from a second side of the armrest body along the armrest axis and is attached to the armrest body for relative axial movement, the second shaft including a rotation support portion that extends from a keyed end to a bushing mount located in an interior space of the armrest body;
a bushing that is attached to the bushing mount and fixed on the second shaft, wherein the bushing is located between the rotation support portion of the second shaft and the armrest body; and
a resilient washer that is located on the second shaft outside the interior space of the armrest body, the resilient washer adapted to bias the second shaft in the axial direction relative to the armrest body away from the first shaft;
wherein the armrest body is adapted to be rotated relative to both the first shaft and the second shaft about the armrest axis.

9. An armrest assembly comprising:
an armrest body;
a first shaft that extends from a first side of the armrest body along an armrest axis and is attached to the armrest body;
a second shaft that extends from a second side of the armrest body along the armrest axis and is attached to the armrest body for relative axial movement, the second shaft including a rotation support portion that extends from a keyed end to a bushing mount; and
a bushing attached to the bushing mount and fixed on the second shaft, wherein the bushing is located between the rotation support portion of the second shaft and the armrest body, wherein the bushing mount is located in an interior space of the armrest body;
wherein the armrest body is adapted to be rotated relative to both the first shaft and the second shaft about the armrest axis.

10. The armrest assembly of claim 9, comprising a resilient member that biases the second shaft in the axial direction relative to the armrest body away from the first shaft.

11. The armrest assembly of claim 10, wherein the resilient member is located outside the interior space of the armrest body.

12. The armrest assembly of claim 10, wherein the resilient member is located between two washers on the second shaft.

* * * * *